(12) United States Patent
Yang et al.

(10) Patent No.: US 10,846,094 B2
(45) Date of Patent: Nov. 24, 2020

(54) METHOD AND SYSTEM FOR MANAGING DATA ACCESS IN STORAGE SYSTEM

(71) Applicant: EMC IP Holding Company LLC, Hopkinton, MA (US)

(72) Inventors: LIfeng Yang, Beijing (CN); Xinlei Xu, Beijing (CN); Jian Gao, Beijing (CN); Ruiyong Jia, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/712,324

(22) Filed: Sep. 22, 2017

(65) Prior Publication Data

US 2018/0088955 A1 Mar. 29, 2018

(30) Foreign Application Priority Data

Sep. 23, 2016 (CN) .......................... 2016 1 0848292

(51) Int. Cl.
| | | |
|---|---|---|
| *G06F 9/38* | (2018.01) | |
| *G06F 12/0888* | (2016.01) | |
| *G06F 3/06* | (2006.01) | |
| *G06F 12/02* | (2006.01) | |
| *G06Q 40/02* | (2012.01) | |

(52) U.S. Cl.
CPC .......... *G06F 9/3836* (2013.01); *G06F 3/0689* (2013.01); *G06F 12/0238* (2013.01); *G06F 12/0888* (2013.01); *G06Q 40/025* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 7,685,368 B1 * | 3/2010 | Fickie | ................... G06F 12/123 |
| | | | 711/133 |
| 8,935,493 B1 | 1/2015 | Dolan et al. | |
| 9,026,765 B1 | 5/2015 | Marshak et al. | |
| 9,047,017 B1 | 6/2015 | Dolan et al. | |
| 9,507,887 B1 | 11/2016 | Wang et al. | |
| 9,898,224 B1 | 2/2018 | Marshak et al. | |
| 10,078,569 B1 | 9/2018 | Alshawabkeh et al. | |

(Continued)

FOREIGN PATENT DOCUMENTS

| | | |
|---|---|---|
| CN | 101009583 | 8/2007 |
| CN | 101867527 | 10/2010 |

(Continued)

*Primary Examiner* — Charles Rones
*Assistant Examiner* — Jonah C Krieger
(74) *Attorney, Agent, or Firm* — Bainwood Huang

(57) ABSTRACT

Embodiments of the present invention relate to a method and system for managing data access in a storage system. A method for managing data access in a storage system, the method comprising: obtaining state information about available resources in a storage control node in the storage system; determining, based on the state information, a credit score descriptive of processing capacity of the storage control node for data access; and publishing the credit score so as to notify a host of the processing capacity of the storage control node for the data access.

17 Claims, 8 Drawing Sheets

(56) References Cited

U.S. PATENT DOCUMENTS

| | | | | |
|---|---|---|---|---|
| 2010/0031347 A1* | 2/2010 | Ohto | ................ | G06F 8/65 |
| | | | | 726/19 |
| 2011/0314182 A1* | 12/2011 | Muppirala | ............. | G06F 13/00 |
| | | | | 710/5 |
| 2014/0237134 A1* | 8/2014 | Branson | ............. | G06F 16/2453 |
| | | | | 709/231 |
| 2014/0279961 A1* | 9/2014 | Schreter | ............... | G06F 3/0608 |
| | | | | 707/693 |
| 2016/0077974 A1* | 3/2016 | Kim | ................... | G06F 12/0804 |
| | | | | 711/135 |
| 2017/0134156 A1* | 5/2017 | Laine | ..................... | G06F 7/483 |
| 2017/0185522 A1* | 6/2017 | Zhang | .................... | G06F 12/08 |
| 2017/0371946 A1* | 12/2017 | Kota | ................... | H04L 67/1095 |
| 2018/0046581 A1* | 2/2018 | Banerjee | ............ | G06F 12/1009 |
| 2019/0205175 A1* | 7/2019 | Aronovich | ........... | G06F 9/4843 |

FOREIGN PATENT DOCUMENTS

| | | |
|---|---|---|
| CN | 102111337 | 6/2011 |
| CN | 102855198 | 1/2013 |
| WO | 2005121956 | 12/2005 |

* cited by examiner

METHOD AND SYSTEM FOR MANAGING DATA ACCESS IN STORAGE SYSTEM

RELATED APPLICATIONS

This application claim priority from Chinese Patent Application Number CN201610848292.3, filed on Sep. 23, 2016 at the State Intellectual Property Office, China, titled "METHOD AND SYSTEM FOR MANAGING DATA ACCESS IN STORAGE SYSTEM" the contents of which is herein incorporated by reference in its entirety.

FIELD

Various embodiments of the present invention relate to storage management, and more specifically, to a method and a system for managing data access in a storage system (e.g. Redundant Array of Independent Disks, RAID).

BACKGROUND

With the development of data storage techniques, various data storage devices now provide users with larger data storage capacity, and also their speed of accessing data has been increased greatly. Besides the increase of data storage capacity, users also impose increasingly high demands on data reliability and response time of storage systems. So far a multitude of RAID-based data storage systems have been developed to increase data reliability. When one or more disks in a storage system fail, data in failing disks can be recovered from data in other disks that operate normally.

As the number of data access requests of users on a data storage system grows, there is an ever-expanding workload on the data storage system. If the data storage system continuously receives from users a huge amount of data access requests, then the workload on it might be increased further and its response speed could no longer satisfy users' needs. Although these problems might be alleviated to some extent by improving hardware configuration of storage control nodes in the data storage system, the improvement in hardware configuration will lead to an increase in costs. On the other hand, when the data access is in a relative low level, these hardware resources will be lain idle and further, and a waste of hardware resources will be caused.

SUMMARY

Therefore, it is desirable to develop and implement a technical solution for effectively managing data access in a storage system and further improving access performance of the storage system. It is desired that the technical solution can be compatible with existing storage systems and manage data access in existing storage systems with higher efficiency without an extra hardware device added to those storage systems.

In one embodiment of the present invention, there is provided a method for managing data access in a storage system, the method comprising: obtaining state information about available resources in a storage control node in the storage system; determining, based on the state information, a credit score descriptive of processing capacity of the storage control node for data access; and publishing the credit score so as to notify a host of the processing capacity of the storage control node for the data access.

In one embodiment of the present invention, there is provided a device for managing data access in a storage system, the device comprising: an obtaining module configured to obtain state information about available resources in a storage control node in the storage system; a determining module configured to determine, based on the state information, a credit score descriptive of processing capacity of the storage control node for data access; and a publishing module configured to publish the credit score so as to notify a host of the processing capacity of the storage control node for the data access.

In one embodiment of the present invention, there is provided a system for managing data access in a storage system, the system comprising: one or more processors; a memory coupled to at least one processor of the one or more processors; computer program instructions stored in the memory which, when executed by the at least one processor, cause the system to execute a method for managing data access in a storage system, the method comprising: obtaining state information about available resources in a storage control node in the storage system; determining, based on the state information, a credit score descriptive of processing capacity of the storage control node for data access; and publishing the credit score so as to notify the processing capacity of the storage control node for the data access.

In one embodiment of the present invention, there is provided a method for managing data access in a storage system, the method comprising: receiving a credit score from a storage control node in the storage system, the credit score being descriptive of processing capacity of the storage control node for data access; and adjusting, based on the credit score, a data access request to be sent from a host to the storage control node.

In one embodiment of the present invention, there is provided a device for managing data access in a storage system, the device comprising: a receiving module configured to receive a credit score from a storage control node in the storage system, the credit score being descriptive of processing capacity of the storage control node for data access; and an adjusting module configured to adjust, based on the credit score, a data access request to be sent from a host to the storage control node.

In one embodiment of the present invention, there is provided a system for managing data access in a storage system, the system comprising: one or more processors; a memory coupled to at least one processor of the one or more processors; computer program instructions stored in the memory which, when executed by the at least one processor, cause the system to execute a method for managing data access in a storage system, the method comprising: receiving a credit score from a storage control node in the storage system, the credit score being descriptive of processing capacity of the storage control node for data access; and adjusting, based on the credit score, a data access request to be sent from a host to the storage control node.

With the technical solution of the present invention, data access in a storage system may be managed effectively, and further access efficiency of the storage system improved.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
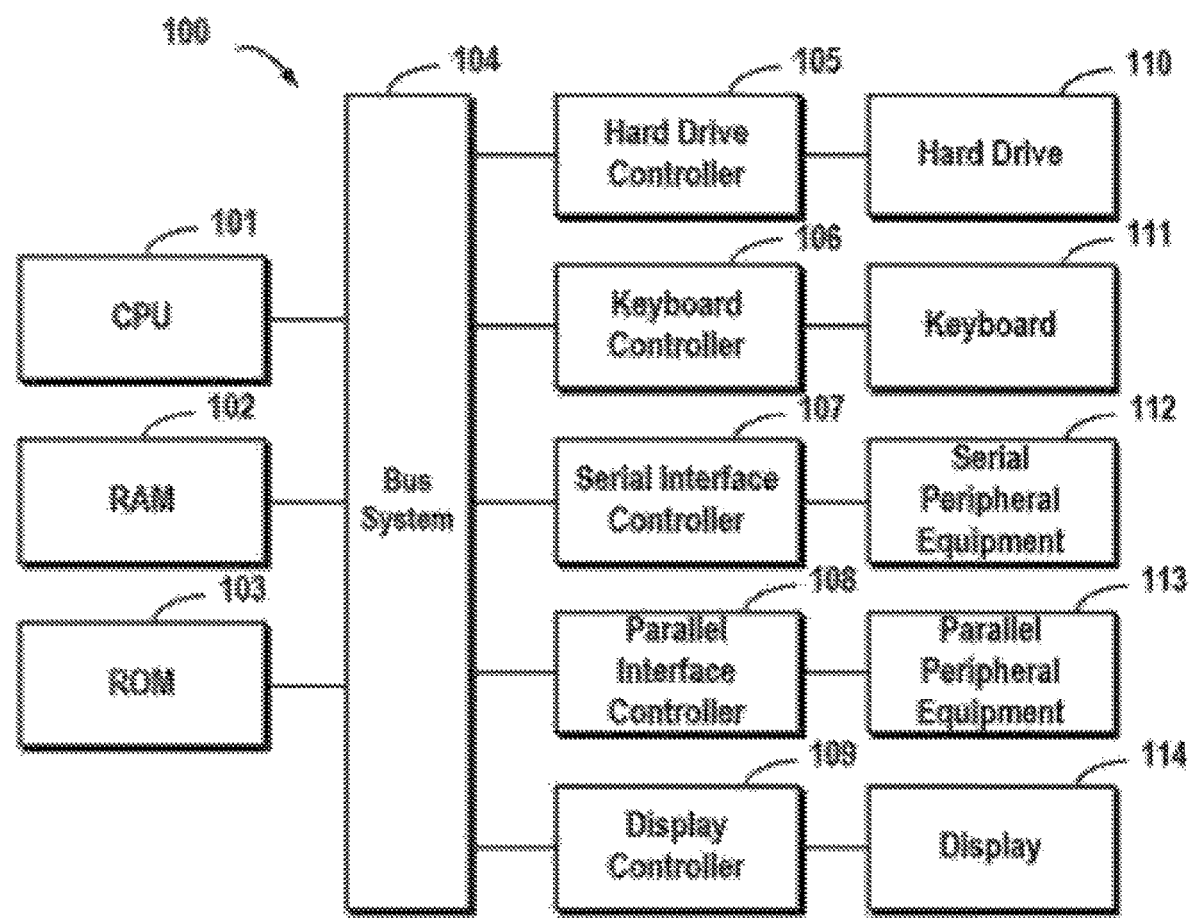
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagram, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Description is presented below to specific implementation of the various embodiments of the present invention by taking RAID as an example of storage systems. RAID may combine multiple storage devices into an array of disks. By providing redundant storage devices, reliability of an entire disk group is caused to significantly exceed a single storage device. RAID may offer a variety of advantages over a single storage device, for example, enhancing data integrity, enhancing fault tolerance, increasing throughput or capacity, etc. With the development of storage devices, RAID has gone through a number of standards, such as RAID-1, RAID-2, RAID-3, RAID-4, RAID-5, RAID-6, RAID-10, RAID-50, etc. The operating system may consider a disk array, consisting of multiple storage devices, as a single logical storage unit or disk. By partitioning the disk allay into multiple stripes, data may be distributed across multiple storage devices, so that low delay and high bandwidth is achieved, and data can be recovered to some extent where some disks crash.

Figure 2:
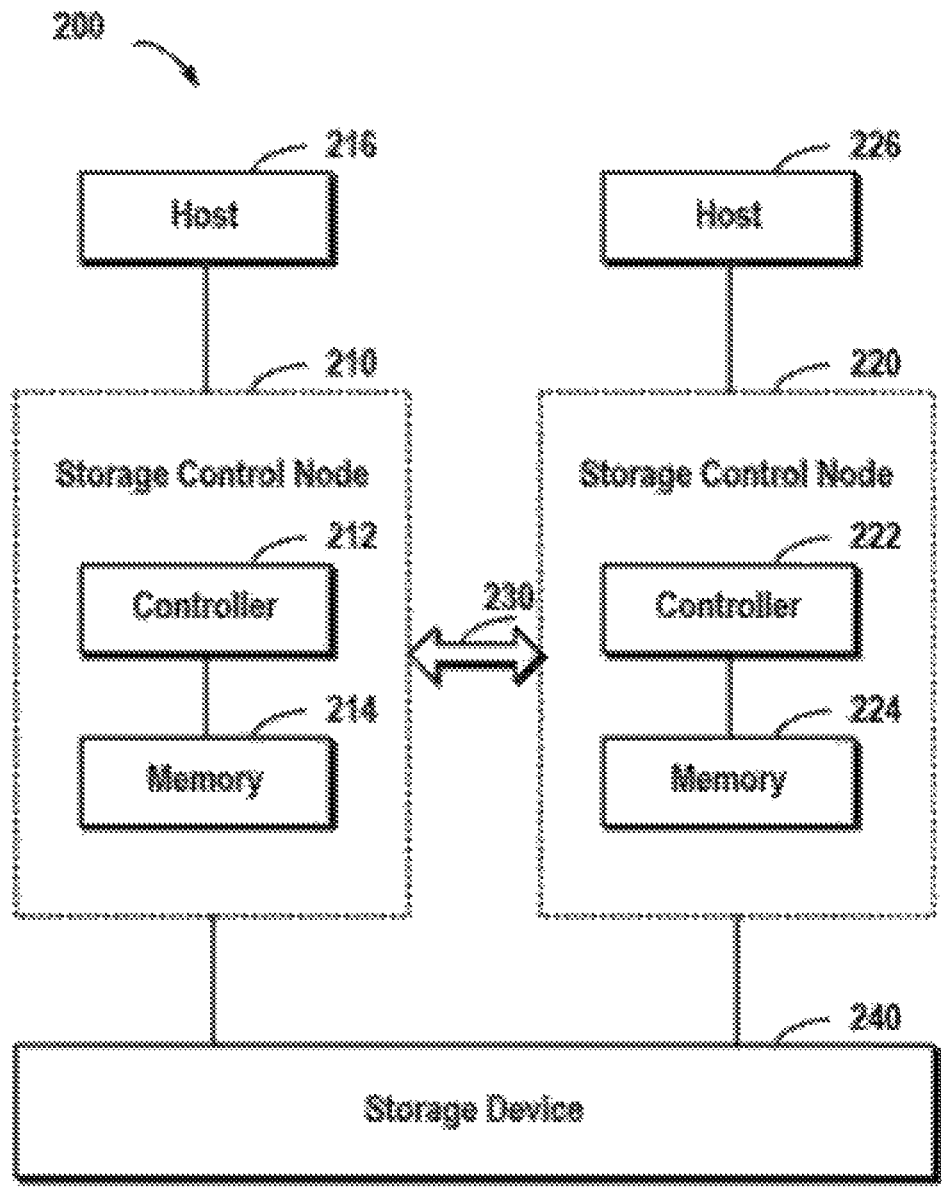
FIG. 2 schematically illustrates a schematic structure view of a data storage system.

FIG. 2 schematically illustrates a structural schematic view of a data storage system 200. As shown in FIG. 2, the storage system 200 may provide data access service to the outside via one or more storage control nodes. In this example, the storage system 200 may comprise storage control nodes 210 and 220. During operation of the storage system 200, the two storage control nodes 210 and 220 may provide service to the outside in parallel. If one node fails, then the other node may continue working. The two storage control nodes 210 and 220 may exchange information through a channel, so as to work in coordination.

The storage control node 210 may comprise a controller 212 and a memory 214 (e.g. cache). When the storage control node 210 receives an access request (e.g. read and write request) from an external host, the controller 212 handles the request and looks up in the memory 214 whether data associated with the request has been loaded to the memory 214 or not. If associated data has been loaded (hit), then the control node 210 may continue executing the access request; if no associated data exists in the memory 214 (miss), then a corresponding available storage space has to be allocated in the memory 214 so as to execute the request.

When responding to a data access request (e.g. read and write request) from a host 216, the control node 210 needs to load data associated with the write request to the memory 214 and perform a series of operations regarding writing data to a storage device 240. However, when the control node 210 receives a large amount of data access requests, a shortage of available resources of the control node 210 will be caused, and further the operational efficiency of the storage system will be severely impaired.

Technical solutions have been developed for managing data access. In one technical solution, a threshold time indicating how long dirty data may be held in a memory may be set based on historical empirical values. If the time for which dirty data has been held in the memory reaches the threshold time, then the dirty data will be flushed to a storage device of a storage system. Although the technical solution can alleviate the memory space shortage in the control node to some extent, the threshold time in the technical solution is set based on historical empirical values, and the size of the threshold will greatly impact on the operational efficiency of the storage system. On the other hand, when the control node faces an influx of many data access requests, the technical solution fails to schedule those data access requests, which will cause available resources in the storage node to be exhausted soon. Therefore, it is desired to develop a technical solution that can manage data access more effectively.

In one embodiment of the present invention, there is provided a method for managing data access in a storage system, the method comprising: obtaining state information about available resources in a storage control node in the storage system; determining, based on the state information, a credit score descriptive of processing capacity of the storage control node for data access; and publishing the credit score so as to notify a host of the processing capacity of the storage control node for the data access.

Figure 3:
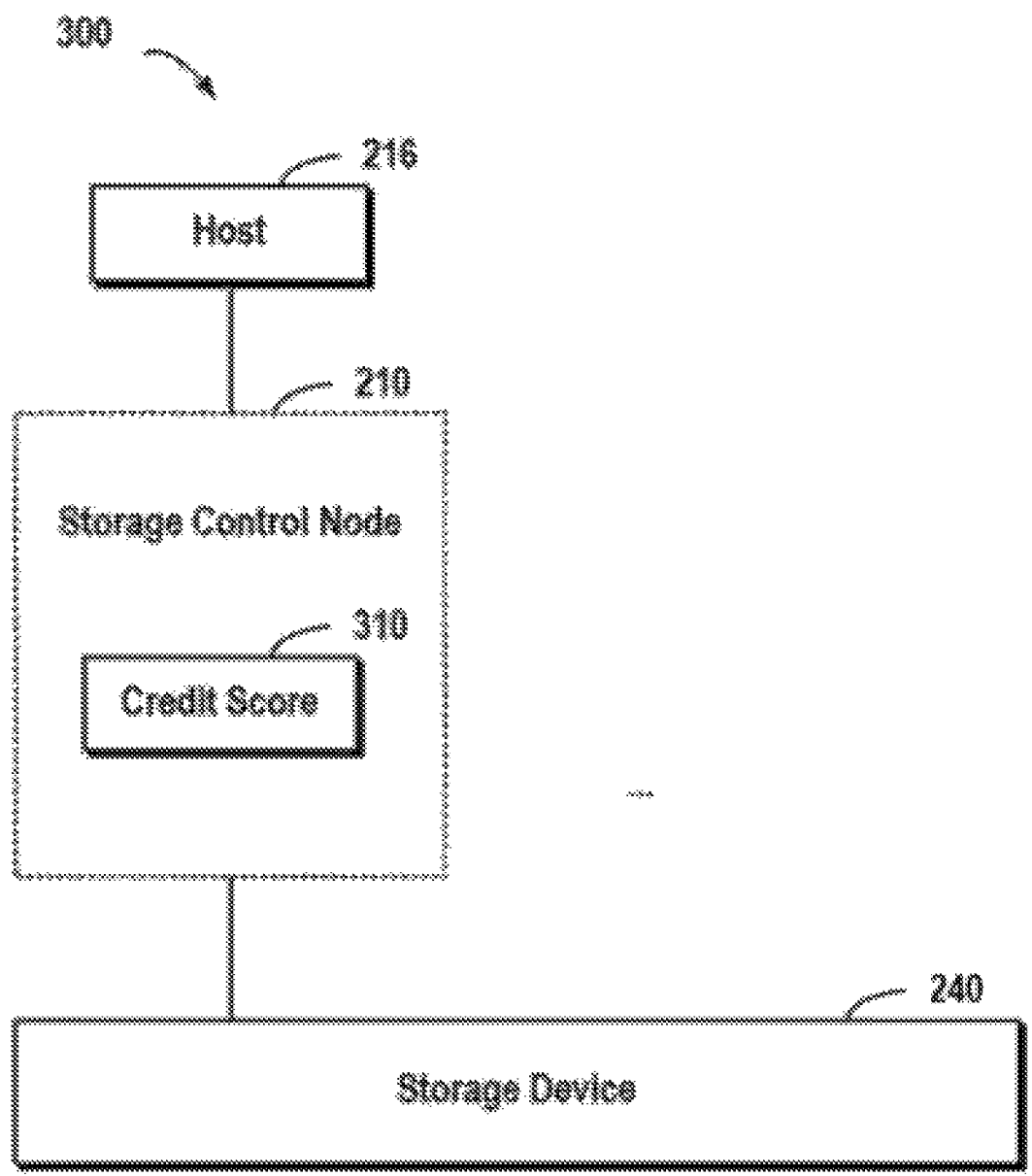
FIG. 3 schematically illustrates an architecture view of a method for managing data access in a storage system according to one embodiment of the present invention.

FIG. 3 schematically shows an architecture view 300 of a method for managing data access in a storage system according to one embodiment of the present invention. As shown in FIG. 3, state information about available resources in the storage control node 210 in the storage system may be obtained, and a credit score 310 descriptive of processing capacity of the storage control node for data access may be determined based on the state information. In this embodiment, the credit score 310 may be published, for example, at a host-side interface in the storage control node 210.

Since the credit score 310 may indicate to the outside the processing capacity of the storage control node 210 for data access, a host (e.g. host 216) coupled to the storage control node 210 may determine, based on the credit score 310, whether to send to the storage control node 210 a data access request. In this way, the host may adjust the time for data access requests to be sent to the storage control node, thereby avoiding the occurrence in the storage control node that the ongoing execution of a data access request has to be canceled due to response inefficiency caused by the resource shortage. In this embodiment, the storage system may be, for example, a VNX storage system.

Figure 4:
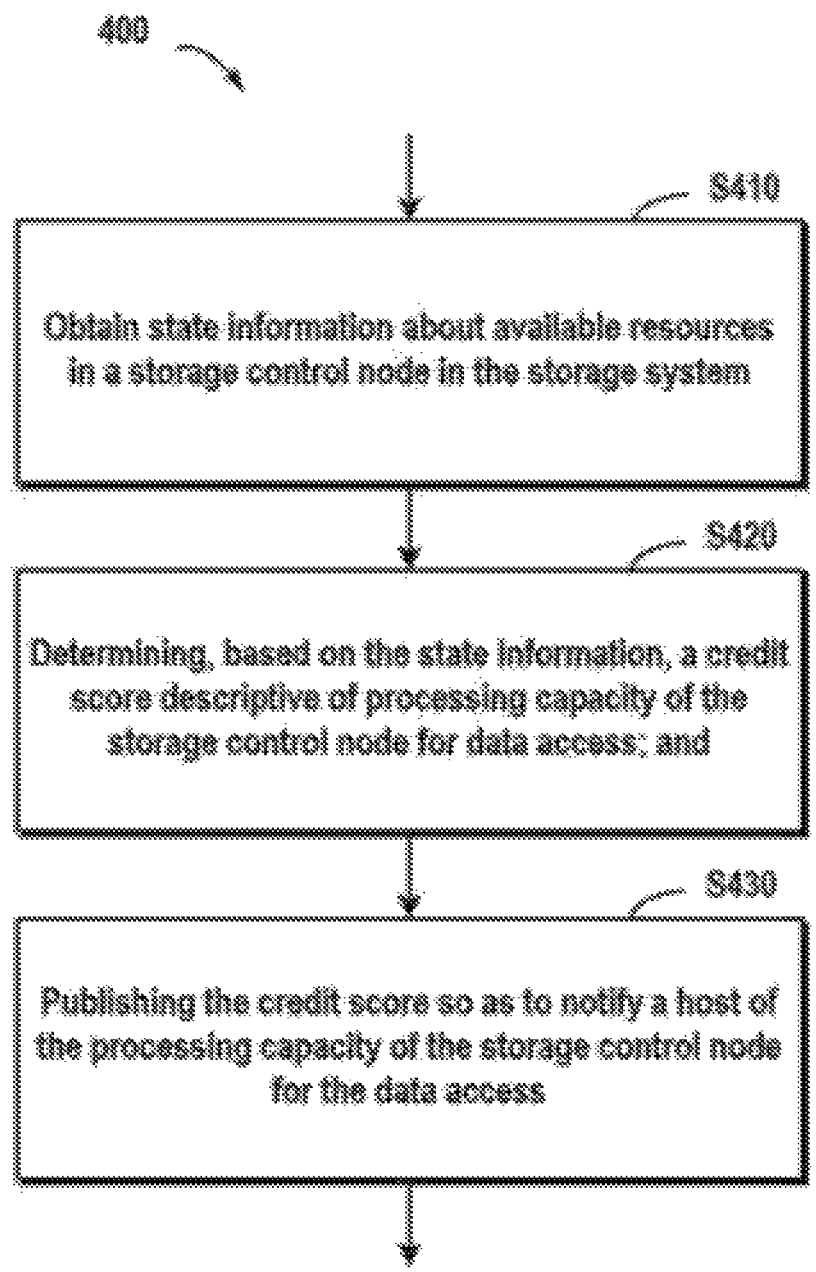
FIG. 4 schematically illustrates a flowchart of a method for managing data access in a storage system according to one embodiment of the present invention.

With reference to FIGS. 4 to 7, detailed description will be presented to concrete details of a method for managing data access. FIG. 4 schematically shows a flowchart 400 of a method for managing data access in a storage system according to one embodiment of the present invention. In step S410, state information about available resources in a storage control node in the storage system is obtained. In this step, the available resources may be various resources that are associated with the execution of data access requests. For example, the available resources may include computing resources like CPU, and memory resources (e.g. DRAM cache and the like in the storage control node, etc.).

In step S420, a credit score descriptive of processing capacity of the storage control node for data access is determined based on the state information. Since the obtained state information is state of available resources, the state may describe, to some extent, the processing capacity of the current storage control node for the data access. For example, if the state information indicates the current storage control node is in an idle state (e.g. both the CPU and the memory have a large amount of available resources), then the storage control node may process amounts of data access, so the credit score may be set to a higher value. For another example, if the state information indicates the current storage node is now running under high load (e.g. most resources of the CPU and the memory have been occupied), then the storage control node is no longer suitable to process new data access, so the credit score may be set to a lower value.

In step S430, the credit score is published for notifying a host of the processing capacity of the storage control node for the data access. The credit score obtained in step S420 may be published, so that an external host coupled to the storage system may determine, according to the value of the credit score, whether to send a data access request to the storage control node in the storage system.

For a conventional storage control node, after receiving a data access request, the storage control node starts to execute the data access request and allocates a corresponding resource to it. If the storage control node receives amounts of data access requests in a short time, then resources in the storage control node might be exhausted and, the response speed of the storage control node is reduced to an intolerable degree.

Unlike the prior art, in one embodiment of the present invention, upon receipt of a data access request from the host, how to process the data access request may be determined based on the value of the current credit score. In particular, in response to receiving from the host a data access request to the storage system, a processing capacity demand associated with the data access request is determined; and the data access request is scheduled according to the processing capacity demand and the credit score. In this way, when it is found available resources in the storage control node are insufficient to support the received data access request, the execution of the data access request may be delayed.

In one embodiment of the present invention, the scheduling the data access request according to the processing capacity demand and the credit score comprises any one of: in response to the processing capacity demand being higher than the credit score, delaying the execution of the data access request; and in response to the processing capacity demand being lower than or equal to the credit score, executing the data access request. Further details regarding how to process the data access request will be described reference to FIG. 5.

Figure 5:
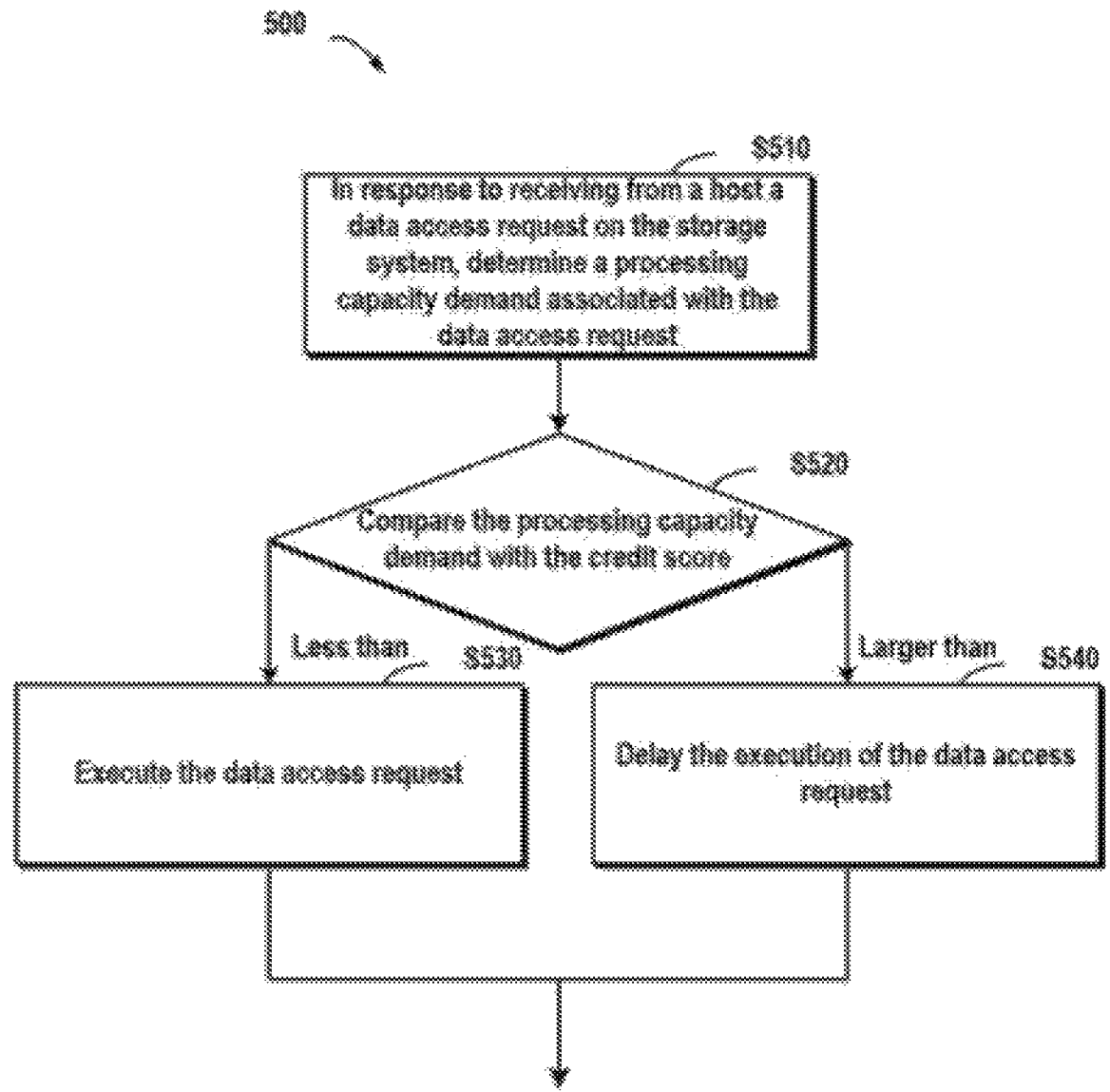
FIG. 5 schematically illustrates a flowchart of a method for managing data access requests in a storage system according to one embodiment of the present invention.

FIG. 5 schematically shows a flowchart 500 of a method for managing data access requests in a storage system according to one embodiment of the present invention. In step S510, in response to receiving from the host a data access request to the storage system, a processing capacity demand associated with the data access request is determined. Usually the processing capacity demand is mainly related to the size of target data involved in the data access request. Therefore, a computation method associated with the size of target data and desired processing capacity may be set in advance. For example, a computation formula may be set with respect to CPU resources and memory resources respectively, so as to obtain a processing capacity demand associated with the received data access request according to the formula. In other embodiments, the processing capacity demand might further be related to other parameter in view of configuration of a specific application environment of the storage system. For example, the data access request may relate to a plurality of priorities, at which point adjustment may be made accordingly according to priority parameters.

In step S520, values of the processing capacity demand and the credit score are compared so as to determine whether there exist in the current storage control node enough resources to process the data access request. If the processing capacity demand is less than the credit score, this means the current storage control node has enough resources, at which point the operational flow proceeds to step S530 and the received data access request is executed. If the processing capacity demand is larger than the credit score, this means the current storage control node does not have enough resources, at which point the operational flow proceeds to step S540 and the execution of the data access request is delayed. In this embodiment, a waiting queue may be set at the storage control node, or a rejection signal may be returned to the host sending the data access request.

In one embodiment of the present invention, the obtaining state information about available resources in a storage control node in the storage system comprises: obtaining at least one of performance of computing resources and performance of cache resources in the storage control node: and the determining, based on the state information, a credit score descriptive of processing capacity of the storage control node for data access comprises: setting the credit score to be in direct proportion to at least one of the performance of the computing resources and the performance of the cache resources.

In this embodiment, available resources may comprise two aspects of the storage control node, i.e. computing resources and cache resources. In particular, the computing resources may be related to the number of cores in CPU, the speed of CPU and the like in the storage control node. The cache resources may be related to the speed at which data blocks in the storage control node are flushed to a storage device in the storage system. For example, component $Credit_{computing}$ concerning, the computing resources aspect in the credit score may be represented using Formula 1 as below:

$$Credit_{computing} = f_1(\text{cpu\_core\_num}) \cdot f_2(\text{cpu\_speed}) \quad \text{Formula 1}$$

Where $f_1$ represents a function in direct proportion to the number of cores in CPU "cpu_core_num" and $f_2$ represents a function in direct proportion to the speed of CPU "cpu_speed." In this embodiment, those skilled in the art may devise specific computation methods for the two functions $f_1$ and $f_2$ according to statistics.

In one embodiment of the present invention, the state information about available resources comprises performance of cache resources, and the obtaining the performance of the cache resources in the storage control node comprises: obtaining recycling time for recycling occupied cache resources in the storage control node; and setting the performance of the cache resources to be in inverse proportion to the recycling time.

When data is written to a cache in the storage control node, since the storage control node might be executing other task, usually the data being written has to wait for a time before flushed to the storage device of the storage control node. The longer the wait time, the longer the response time of the cache to a new data access request. Thus, at this point the performance of the cache resources is set to be in inverse to the recycling time.

In one embodiment of the present invention, the obtaining recycling time for recycling occupied cache resources in the storage control node comprises: calculating the recycling time based on at least one of potential residing time of dirty data blocks in a cache in the storage system and potential flushing time of flushing dirty data blocks to a storage device in the storage system. The longer dirty data resides in the cache, the longer the recycling time is; hence, the recycling time is in direct proportion to the residing time. Moreover, the longer the flushing action lasts, the longer the recycling time; hence, the recycling time is also in direct proportion to the flushing time. In this embodiment, both the residing time and the flushing time may be obtained based on historical empirical values.

In one embodiment of the present invention, the obtaining recycling time for recycling occupied cache resources in the storage control node further comprises: calculating the recycling time based on the number of dirty data blocks in the storage system. The more dirty data blocks is, the larger the recycling time is, so the recycling time is in direct proportion to the number of dirty data blocks.

The storage system may be accessed via storage control nodes. In a typical active-active (also referred to as dual active) type of storage system, two storage node controls work jointly to process data access operations on the storage system and further provide higher availability and better performance. Each storage control node has its own memory (e.g. cache), and memories in two storage controllers operate in a mirroring mode. The two storage control nodes may concurrently receive data access instructions from the outside. At this point, synchronization between the two storage control nodes is required so as to ensure data consistency. With reference to the example in FIG. 2, description is presented below to details of synchronization between the two storage control nodes.

Return to FIG. 2, the other storage control node 220 comprises a controller 222 and a corresponding memory 224, and operates in a way similar to the storage control node 210. The two storage control nodes 210 and 220 may operate in parallel for handling different access requests. Note the memories 214 and 224 shown in FIG. 2 are mirrored memories, and data in corresponding mirrored pages comprised in the two memories corresponds to each other. Specifically, if the controller 212 modifies data in storage page A (status of which storage page is "dirty") in the memory 214 during processing the write operation, then content of the "dirty" data needs to be duplicated to mirrored page A' in the other memory 224 which corresponds to storage page A, so as to ensure the synchronization of data in the two memories 214 and 224.

At this point, dirty data blocks not only involve ones associated with the data access request received by the current storage control node, but also may involve others generated during synchronization with the other storage control node. In one embodiment of the present invention, the obtaining recycling time for recycling occupied cache resources in the storage control node further comprises: calculating the recycling time based on the number of dirty data blocks associated with synchronization between the storage control node and another storage control node in the storage system.

Therefore, in the embodiment of the present invention, component $Credit_{recycling}$ associated with the recycling time in the credit score may be calculated according to Formula 2:

$$Credit_{recycling\_time}=f_3(residing\_time) \cdot f_4(flushing\_time) \cdot f_5(dirty\_num) \cdot f_6(dirty\_syn\_num) \quad \text{Formula 2}$$

Where $f_3$ represents a function in direct proportion to the potential residing time "residing_time" of dirty data blocks in a cache in the storage system, and $f_4$ represents a function in direct proportion to the potential flushing time "flushing_time" of flushing dirty data blocks to a storage device in the storage system, wherein $f_5$ represents a function in direct proportion to the number "dirty_num" of dirty data blocks in the storage system, and $f_6$ represents a function in direct proportion to the number "dirty_syn_num" of dirty data blocks associated with synchronization between the storage control node and another storage control node in the storage system. In this embodiment, those skilled in the art may devise specific computation methods for the functions $f_3$ to $f_6$ according to statistics.

In one embodiment of the present invention, the state information about available resources comprises performance of cache resources, and the obtaining the performance of the cache resources in the storage control node comprises: calculating the performance of the cache resources based on a recycling plan for recycling occupied cache resources in the storage control node. Since the recycling plan is related to efficiency of recycling dirty data, the performance of the cache resources may further be determined based on length of a waiting queue.

In one embodiment of the present invention, the calculating the performance of the cache resources based on a recycling plan for recycling occupied cache resources in the storage control node comprises: obtaining a length of at least one queue, indicative of dirty data blocks in the occupied cache which wait to be flushed to a storage device of the storage control node and setting the performance of the cache resources to be in direct proportion to the length of at least one queue. In this embodiment, the storage control node may comprise a plurality of queues based on different priorities; the longer the queue length, the more to-be-flushed data blocks, and the more to-be-recycled spaces in the occupied portion of the cache. Therefore, the performance of the cache resources may be set to be in direct proportion to the queue length. Specifically, the component $Credit_{recycling\_plan}$ associated with the recycling plan in the credit score may be calculated based on Formula 3:

$$Credit_{recycling\_plan}=f_7(queue\_length) \quad \text{Formula 3}$$

Where $f_7$ represents a function in direct proportion to the length "queue_length" of a queue indicative of dirty data blocks in the occupied cache which wait to be flushed to a storage device of the storage system. In this embodiment, those skilled in the art may device a specific computation method for $f_7$ according to statistics.

By combining the above three factors described by Formulas 1 to 3, the credit score Credit may be described using Formula 4 as below:

$$Credit=Credit_{computing} \cdot Credit_{recycling\_time} \cdot Credit_{recycling\_plan}=f_1(cpu\_core\_num) \cdot f_2(cpu\_speed) \cdot f_3(residing\_time) \cdot f_4(flushing\_time) \cdot f_5(dirty\_num) \cdot f_6(dirty\_syn\_num) \cdot f_7(queue\_length) \quad \text{Formula 4}$$

According to the embodiment of the present invention, the host may determine, based on the credit score published by the storage control node, when to send a data access request to the storage control node so as to make more effective use of available resources in the storage control node and further avoid the occurrence of processing inefficiency due to resource exhaustion and other reason in the storage control node.

In one embodiment of the present invention, there is proposed a method for managing data access in a storage system, the method comprising: receiving a credit score from a storage control node in the storage system, the credit score being descriptive of processing capacity of the storage control node for data access; and adjusting, based on the credit score, a data access request to be sent from a host to the storage control node.

Figure 6:
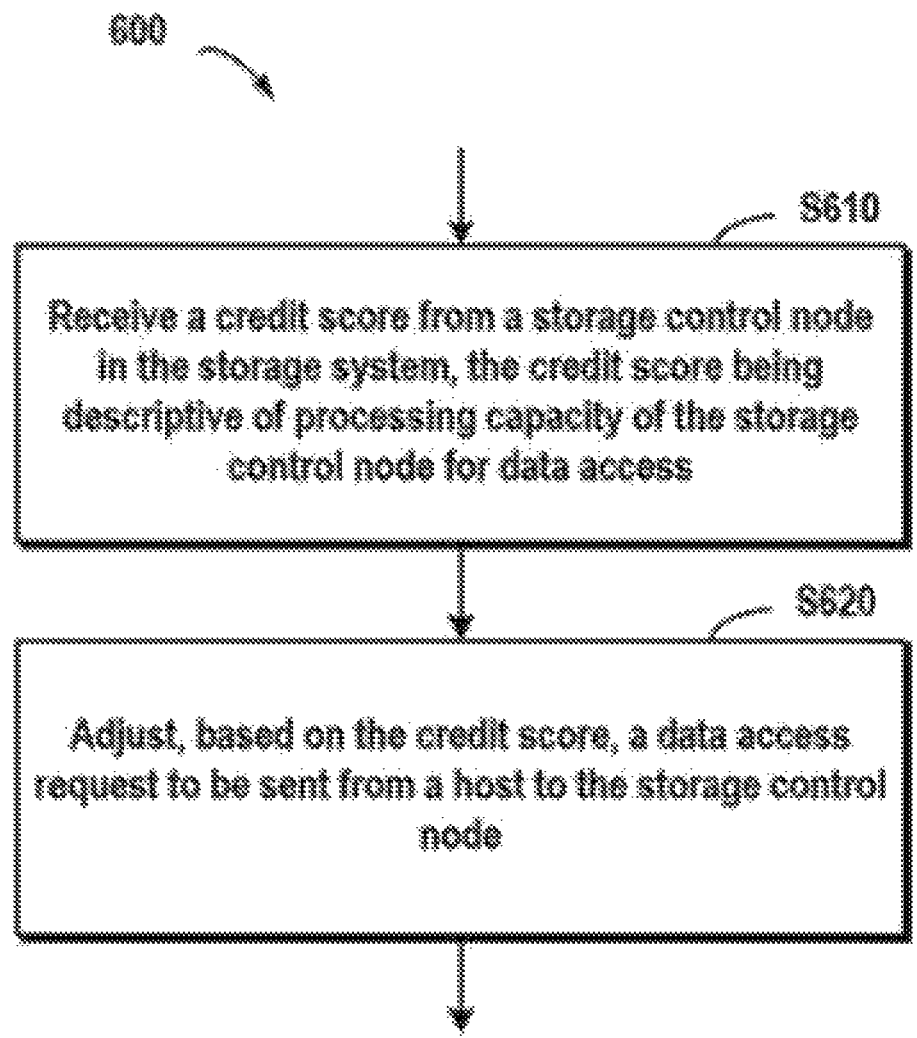
FIG. 6 schematically illustrates a flowchart of a method for managing data access in a storage system according to one embodiment of the present invention.

FIG. 6 schematically shows a flowchart 600 of a method for managing data access in a storage system according to one embodiment of the present invention. In step S610, a credit score is received from a storage control node in the storage system, the credit score being descriptive of processing capacity of the storage control node for data access. In this embodiment, the received credit score is the credit score published with reference to FIG. 4 above. In step S620, a data access request to be sent from a host to the storage control node is adjusted based on the credit score. In this step, the host may determine when to send a data access request to the storage control node, based on the credit score published by the storage control node.

Since the number of data access requests at the host is related to a future given time period, how to process data access requests may be determined with respect to a future given time period. In one embodiment of the present invention, the adjusting, based on the credit score, a data access request to be sent from a host to the storage control node comprises: with respect to a predefined time period, obtaining a processing capacity demand involved in the data access request within the predefined time period; and adjusting the data access requests according to the processing capacity demand and the credit score.

In one embodiment of the present invention, the adjusting the data access request according to the processing capacity demand the credit score comprises any one of: in response to the processing capacity demand being higher than the credit score, delaying sending the data access request to the storage control node; and in response to the processing capacity demand being lower than or equal to the credit score, sending the data access request to the storage control node.

Figure 7:
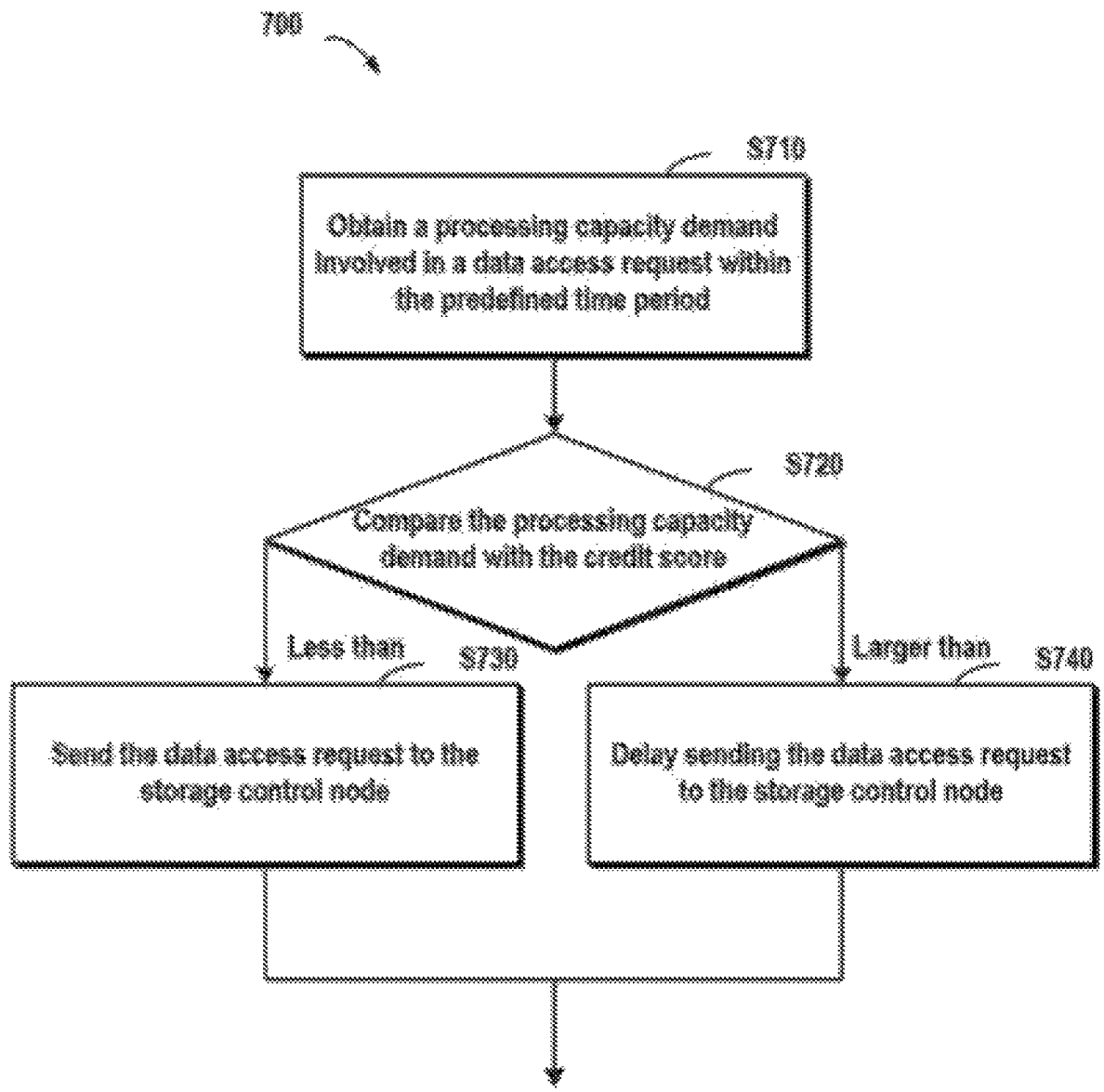
FIG. 7 schematically illustrates a flowchart of a method for managing data access in a storage system according to one embodiment of the present invention.

With reference to FIG. 7, detailed description is now presented to specific details. FIG. 7 schematically shows a flowchart 700 of a method for managing data access requests in a storage system according to one embodiment of the present invention. In step S710, a processing capacity demand involved in the data access request within the predefined time period is obtained. In this step, since the processing capacity demand is related to the data amount involved in the data access request, it may be obtained using a similar approach as described above. Next in step S720, the processing capacity demand is compared with the credit score. When the processing capacity demand is larger than the credit score, the flow proceeds to step S740 to delay sending the data access request to the storage control node; when the processing capacity demand is less than the credit score, the flow proceeds to step S730 to send the data access request to the storage control node.

In one embodiment of the present invention, there is further comprised: sending the processing capacity demand to the storage control node so as to notify the storage control node to schedule available resources at the storage control node. In this embodiment, since the host may predict in advance the type of the data access request and the data amount being involved, the storage control node may be notified of the processing capacity demand in advance so that the storage control node may prepare required resources for the incoming data access request.

In one embodiment of the present invention, after receiving the notification of the processing capacity demand, the storage control node may schedule various resources at the storage control node in advance, for example, flushing dirty data to a storage device, reserving computing resources and cache resources to a data access request with a higher priority, and so on.

In one embodiment of the present invention, those skilled in the art may transmit the credit score based on configuration of a specific application environment (e.g. the transmitting may be implemented based on various primitives in VNX storage systems). Input/output request packets (I/O request packets, abbreviated to IRPs) are kernel structure that describes I/O requests. By means of IRPs, communication is enabled between upper-layer structure of the storage control node and an underlying storage device. In one embodiment of the present invention, a new primitive may be defined between a DRAM cache and the upper-layer structure: IOCTL_CACHE_CREDIT_DATA, which may be implemented as below:

```
// Upperstream parameter for IOCTL_CACHE_CREDIT_DATA
struct IoctlCacheCreditUpperStream {
    ULONG acquiredCredit; //Credit that is passed to upper layered stack
    ULONG cacheDelayCompletion;   // time count of cache delay completion
    UINT_32 spare;    // Spare bytes for future use.
};
// Downstream parameter for IOCTL_CACHE CREDIT_DATA
struct IoctlCacheCreditDownStream {
  ULONG64 requestedCredit;   //Credit that is requested from upper layer
      UINT_32 spare[2];         // Spare bytes for future use.
};
```

Note one specific example for transmitting the credit score has been presented above for the illustration purpose only. Those skilled in the art may adopt other implementation according to specific configuration of a storage system.

Figure 8A:
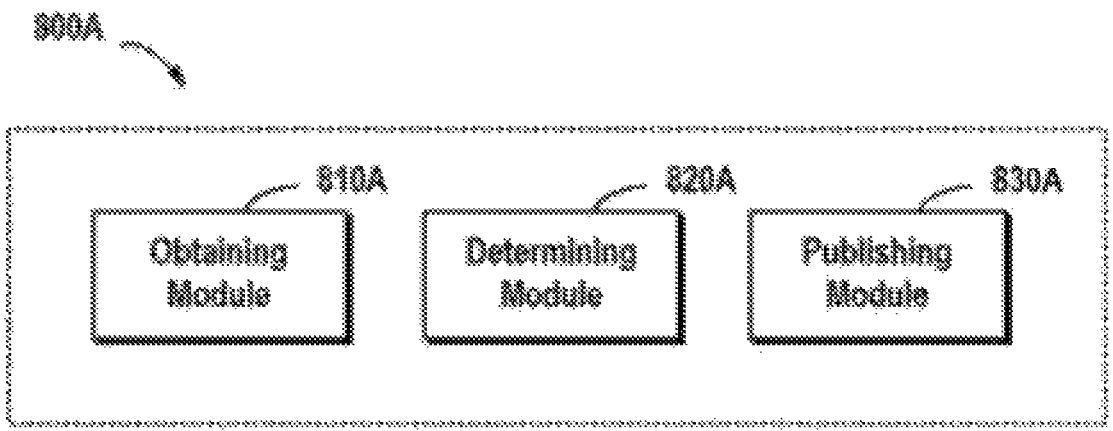
FIGS. 8A and 8B each schematically illustrate a block diagram of a device for managing data access in a storage system according to one embodiment of the present invention.

FIG. 8A schematically shows a block diagram of a device for managing data access in a storage system according to one embodiment of the present invention. As shown in FIG. 8A, there is provided a device 800A for managing data access in a storage system, the device 800A comprising: an obtaining module 810A configured to obtain state information about available resources in a storage control node in the storage system; a determining module 820A configured to determine, based on the state information, a credit score descriptive of processing capacity of the storage control node for data access; and a publishing module 830A configured to publish the credit score so as to notify a host of the processing capacity of the storage control node for the data access.

In one embodiment of the present invention, there is further comprised: a demand determining module configured to, in response to receiving from the host, a data access request on the storage system, determine a processing capacity demand associated with the data access request; and a scheduling module configured to schedule the data access request according to the processing capacity demand and the credit score.

In one embodiment of the present invention, the scheduling module is further configured to: in response to the processing capacity demand being higher than the credit score, delay the execution of the data access request; and in response to the processing capacity demand being lower than or equal to the credit score, execute the data access request.

In one embodiment of the present invention, the obtaining module 810A is further configured to: obtain at least one of performance of computing resources and performance of cache resources in the storage control node; and the determining module 820A is further configured to: set the credit score to be in direct proportion to the at least one of the performance of computing resources and the performance of cache resources.

In one embodiment of the present invention, the state information of available resources comprises performance of cache resources, and the obtaining module 810A is further configured to: obtain a recycling time for recycling occupied cache resources in the storage control node; and set the performance of the cache resources to be in inverse proportion to the recycling time.

In one embodiment of the present invention, the obtaining module 810A is further configured to: calculate the recycling time based on at least one of a potential residing time of dirty data blocks in a cache in the storage system and a potential flushing time for flushing dirty data blocks to a storage device in the storage system.

In one embodiment of the present invention, the obtaining module 810A is further configured to: calculate the recycling time based on the number of dirty data blocks in the storage system.

In one embodiment of the present invention, the obtaining module 810A is further configured to: calculate the recycling time based on the number of dirty data blocks associated with synchronization between the storage control node and another storage control node in the storage system.

In one embodiment of the present invention, the state information about available resources comprises performance of cache resources, and the obtaining module 810A is further configured to: calculate the performance of the cache resources based on a recycling plan for recycling occupied cache resources in the storage control node.

In one embodiment of the present invention, the obtaining module 810A is further configured to: obtain a length of at least one queue, indicative of dirty data blocks in the occupied cache which wait to be flushed to a storage device in the storage system; and set the performance of the cache resources to be in direct proportion to the length of at least one queue.

Figure 8B:
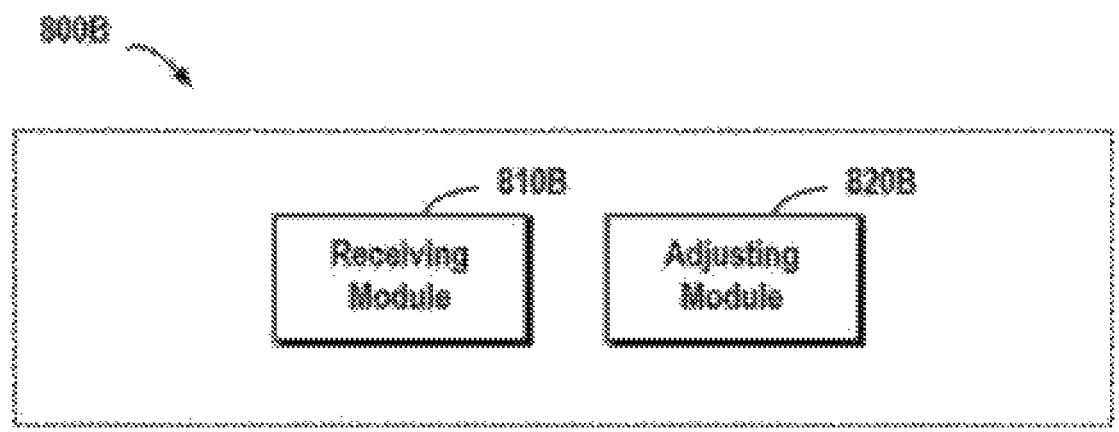

FIG. 8B schematically shows a block diagram of a device for managing data access in a storage system according to one embodiment of the present invention. As shown in FIG. 8B, there is provided a device for managing data access in a storage system, the device comprising: a receiving module 810B configured to receive a credit score from a storage control node in the storage system, the credit score being descriptive of processing capacity of the storage control node for data access; and an adjusting module 820B configured to adjust, based on the credit score, a data access request to be sent from a host to the storage control node.

In one embodiment of the present invention, the adjusting module 820B is further configured to: with respect to a predefined time period, obtain a processing capacity demand involved in the data access request within the predefined time period; and adjust the data access request according to the processing capacity demand and the credit score.

In one embodiment of the present invention, the adjusting module 820B is further configured to: in response to the processing capacity demand being higher than the credit score, delay sending the data access request to the storage control node; and in response to the processing capacity demand being lower than or equal to the credit score, send the data access request to the storage control node.

In one embodiment of the present invention, there is further comprised: a sending module configured to send the processing capacity demand to the storage control node so as to notify the storage control node to schedule available resources at the storage control node.

In one embodiment of the present invention, there is provided a system for managing data access in a storage system, the system comprising: one or more processors; a memory coupled to at least one processor of the one or more processors; computer program instructions stored in the memory which, when executed by the at least one processor, cause the system to execute a method for managing data access in a storage system, the method comprising: obtaining state information about available resources in a storage control node in the storage system; determining, based on the state information, a credit score descriptive of processing capacity of the storage control node for data access; and publishing the credit score so as to notify the processing capacity of the storage control node for the data access.

In one embodiment of the present invention, the computer program instructions further cause the system to: in response to receiving from the host a data access request on the storage system, determine a processing capacity demand associated with the data access request; and schedule the data access request according to the processing capacity demand and the credit score.

In one embodiment of the present invention, the computer program instructions further cause the system to: in response to the processing capacity demand being higher than the credit score, delay the execution of the data access request; and in response to the processing capacity demand being lower than or equal to the credit score, execute the data access request.

In one embodiment of the present invention, the computer program instructions further cause the system to: obtain at least one of performance of computing resources and performance of cache resources in the storage control node; and set the credit score to be in direct proportion to the at least one of the performance of computing resources and the performance of cache resources.

In one embodiment of the present invention, the computer program instructions further cause the system to: obtain a recycling time for recycling occupied cache resources in the storage control node; and set the performance of the cache resources to be in inverse proportion to the recycling time.

In one embodiment of the present invention, the computer program instructions further cause the system to: calculate the recycling time based on at least one of a potential residing time of a dirty data block in a cache in the storage system and a potential flushing time for flushing a dirty data block to a storage device in the storage system.

In one embodiment of the present invention, the computer program instructions further cause the system to: calculate the recycling time based on the number of dirty data blocks in the storage system.

In one embodiment of the present invention, the computer program instructions further cause the system to: calculate the recycling time based on the number of dirty data blocks associated with synchronization between the storage control node and another storage control node in the storage system.

In one embodiment of the present invention, the computer program instructions further cause the system to: calculate the performance of the cache resources based on a recycling plan for recycling occupied cache resources in the storage control node.

In one embodiment of the present invention, the computer program instructions further cause the system to: obtain a length of at least one queue, indicative of dirty data blocks in the occupied cache which wait to be flushed to a storage device in the storage system; and set the performance of the cache resources to be in direct proportion to the length of at least one queue.

In one embodiment of the present invention, there is provided a system for managing data access in a storage system, the system comprising: one or more processors; a memory coupled to at least one processor of the one or more processors; computer program instructions stored in the memory which, when executed by the at least one processor, cause the system to execute a method for managing data access in a storage system, the method comprising: receiving a credit score from a storage control node in the storage system, the credit score being descriptive of processing capacity of the storage control node for data access; and adjusting, based on the credit score, a data access request to be sent from a host to the storage control node.

In one embodiment of the present invention, the computer program instructions further cause the system to: with respect to a predefined time period, obtain a processing capacity demand involved in the data access request within the predefined time period; and adjust the data access request according to the processing capacity demand and the credit score.

In one embodiment of the present invention, the computer program instructions further cause the system to: in response to the processing capacity demand being higher than the credit score, delay sending the data access request to the storage control node; and in response to the processing capacity demand being lower than or equal to the credit score, send the data access request to the storage control node.

In one embodiment of the present invention, the computer program instructions further cause the system to: send the processing capacity demand to the storage control node so as to notify the storage control node to schedule available resources at the storage control node.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of managing data access in a storage system, comprising:
    obtaining, by a storage control node in the storage system, state information about available resources in the storage system;
    determining, by the storage control node based on the state information, a credit score descriptive of processing capacity of the storage control node for input/output (IO) access;
    publishing, by the storage control node, the credit score so as to notify a host of the processing capacity of the storage control node for the IO access, a processing capacity demand associated with an IO request being determined by the host;
    in response to the processing capacity demand being higher than the credit score, delaying receiving, at the storage control node, the IO request from the host; and
    in response to the processing capacity demand being lower than or equal to the credit score, receiving, at the storage control node, the IO request from the host,
    wherein the obtaining state information about available resources in the storage system comprises:
        obtaining at least one of a performance of computing resources and a performance of cache resources in the storage control node; and
    wherein the determining, based on the state information, a credit score descriptive of processing capacity of the storage control node for IO access comprises:
        setting the credit score to be in direct proportion to the at least one of the performance of computing resources and the performance of cache resources.

2. The method according to claim 1, further comprising:
    in response to receiving, at the storage control node, the IO request from the host, scheduling the IO request for execution.

3. The method according to claim 1, wherein the state information of available resources comprises a performance of cache resources, and the obtaining the performance of the cache resources in the storage control node comprises:
    obtaining a recycling time for recycling occupied cache resources in the storage control node; and
    setting the performance of the cache resources to be in inverse proportion to the recycling time.

4. The method according to claim 3, wherein the obtaining a recycling time for recycling occupied cache resources in the storage control node comprises:

calculating the recycling time based on at least one of a potential residing time of a dirty data block in a cache in the storage system and a potential flushing time for flushing a dirty data block to a storage device in the storage system.

5. The method according to claim 4, wherein the obtaining a recycling time for recycling occupied cache resources in the storage control node further comprises:
calculating the recycling time based on the number of dirty data blocks in the storage system.

6. The method according to claim 4, wherein the obtaining a recycling time for recycling occupied cache resources in the storage control node further comprises:
calculating the recycling time based on the number of dirty data blocks associated with synchronization between the storage control node and another storage control node in the storage system.

7. The method according to claim 1, wherein the state information about available resources comprises a performance of cache resources, and the obtaining the performance of the cache resources in the storage control node comprises:
calculating the performance of the cache resources based on a recycling plan for recycling occupied cache resources in the storage control node.

8. The method according to claim 7, wherein the calculating the performance of the cache resources based on a recycling plan for recycling occupied cache resources in the storage control node comprises:
obtaining a length of at least one queue, indicative of dirty data blocks in the occupied cache which wait to be flushed to a storage device in the storage system; and
setting the performance of the cache resources to be in direct proportion to the length of at least one queue.

9. A system for managing data access in a storage system, the system comprising:
one or more processors;
a memory coupled to at least one processor of the one or more processors; and
computer program instructions stored in the memory which, when executed by the at least one processor, cause the system to execute a method of managing input/output (IO) access in a storage system, the method comprising:
obtaining state information about available resources in the storage system;
determining, based on the state information, a credit score descriptive of processing capacity of the storage control node for the IO access;
publishing the credit score so as to notify a host of the processing capacity of the storage control node for the IO access, a processing capacity demand associated with an IO request being determined by the host;
in response to the processing capacity demand being higher than the credit score, delaying receiving the IO request from the host; and
in response to the processing capacity demand being lower than or equal to the credit score, receiving the IO request from the host,
wherein the computer program instructions further cause the system to:
obtain at least one of a performance of computing resources and a performance of cache resources in the storage control node; and
set the credit score to be in direct proportion to the at least one of the performance of computing resources and the performance of cache resources.

10. The system according to claim 9, wherein the computer program instructions further cause the system to:
in response to receiving the IO request from the host, schedule the IO request for execution.

11. The system according to claim 9, wherein the computer program instructions further cause the system to:
obtain a recycling time for recycling occupied cache resources in the storage control node; and
set the performance of the cache resources to be in inverse proportion to the recycling time.

12. The system according to claim 11, wherein the computer program instructions further cause the system to:
calculate the recycling time based on at least one of a potential residing time of a dirty data block in a cache in the storage system and a potential flushing time for flushing a dirty data block to a storage device in the storage system.

13. The system according to claim 12, wherein the computer program instructions further cause the system to:
calculate the recycling time based on the number of dirty data blocks in the storage system.

14. The system according to claim 12, wherein the computer program instructions further cause the system to:
calculate the recycling time based on the number of dirty data blocks associated with synchronization between the storage control node and another storage control node in the storage system.

15. The system according to claim 9, wherein the computer program instructions further cause the system to:
calculate the performance of the cache resources based on a recycling plan for recycling occupied cache resources in the storage control node.

16. The system according to claim 15, wherein the computer program instructions further cause the system to:
obtain a length of at least one queue, indicative of dirty data blocks in the occupied cache which wait to be flushed to a storage device in the storage system; and
set the performance of the cache resources to be in direct proportion to the length of at least one queue.

17. A method of managing data access in a storage system, comprising:
obtaining, by a storage control node in the storage system, state information about available resources in the storage system;
determining, by the storage control node based on the state information, a credit score descriptive of processing capacity of the storage control node for input/output (IO) access;
receiving, at the storage control node, an IO request from a host;
having received the IO request from the host, determining, by the storage control node, a processing capacity demand associated with the IO request;
in response to the processing capacity demand being higher than the credit score, delaying, by the storage processing node, execution of the IO request; and
in response to the processing capacity demand being lower than or equal to the credit score, executing, by the storage control node, the IO request,
wherein the obtaining state information about available resources in the storage system comprises:
obtaining at least one of a performance of computing resources and a performance of cache resources in the storage control node; and wherein the determining, based on the state information, a credit score descriptive of processing capacity of the storage control node for IO access comprises:
setting the credit score to be in direct proportion to the at least one of the performance of computing resources and the performance of cache resources.

* * * * *